(12) United States Patent
Jeong et al.

(10) Patent No.: US 6,269,220 B1
(45) Date of Patent: *Jul. 31, 2001

(54) SYSTEM DECODER AND METHOD USING A SINGLE MEMORY FOR A DIGITAL VIDEO DISC PLAYBACK DEVICE

(75) Inventors: Jong-Sik Jeong; Jae-Seong Shim, both of Seoul; Chan-Dong Cho; Byung-Jun Kim, both of Suwon, all of (KR)

(73) Assignee: Samsung Electronics Co., Ltd., Suwon (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/866,570

(22) Filed: Jun. 2, 1997

(30) Foreign Application Priority Data

May 31, 1996 (KR) .................................. 96-19230

(51) Int. Cl.[7] ...................................... H04N 7/26

(52) U.S. Cl. ........................ 386/109; 386/125; 348/716

(58) Field of Search ............................. 386/45, 111–112, 386/124–126, 109; 330/4; 360/32; 369/60, 48; 348/423, 462, 716, 718–719; H04N 5/917

(56) References Cited

U.S. PATENT DOCUMENTS

| | | | |
|---|---|---|---|
| 5,398,072 | * 3/1995 | Auld | 348/426 |
| 5,502,494 | * 3/1996 | Auld | 348/426 |
| 5,519,681 | * 5/1996 | Maeda et al. | 369/49 |
| 5,555,229 | * 9/1996 | Kojima et al. | 369/60 |
| 5,590,106 | * 12/1996 | Shimizume et al. | 369/50 |
| 5,596,558 | * 1/1997 | Arataki et al. | 369/53 |
| 5,602,812 | * 2/1997 | Miura et al. | 369/48 |
| 5,612,939 | * 3/1997 | Ueki et al. | 369/48 |
| 5,694,380 | * 12/1997 | Shimizume et al. | 369/50 |
| 5,737,415 | * 4/1998 | Akiyama et al. | 380/4 |
| 5,751,887 | * 5/1998 | Nitta et al. | 386/68 |
| 5,793,724 | * 8/1998 | Ichikawa et al. | 369/60 |
| 5,835,636 | * 11/1998 | Auld | 348/714 |

* cited by examiner

*Primary Examiner*—Wendy R. Garber
*Assistant Examiner*—Vincent F. Boccio
(74) *Attorney, Agent, or Firm*—Sughrue, Mion, Zinn, Macpeak & Seas, PLLC

(57) ABSTRACT

Disclosed is an inexpensive and miniaturized digital video disc playback device having a system decoder capable of error correcting and data buffering by means of a single memory without employing separate error correcting and data buffering memories. The inventive system decoder for demodulating, error correcting, deinterleaving and descrambling of data reproduced from a disc in the digital video disc playback device, includes a memory and a memory controller for generating memory control signals for accessing the memory to record and read data when demodulating, error correcting and descrambling the reproduced data.

30 Claims, 4 Drawing Sheets

SYSTEM DECODER AND METHOD USING A SINGLE MEMORY FOR A DIGITAL VIDEO DISC PLAYBACK DEVICE

The present invention is based on Korean Patent Application No. 19230/1996, which is incorporated herein by reference for all purposes.

BACKGROUND OF THE INVENTION

1. Field of the Invention

The present invention relates to a system decoder and method for an optical disc playback device, and more particularly to a system decoder and method for a digital video (or versatile) disc playback device.

2. Description of the Related Art

The digital video disc, which is one type of digital animation disc medium, is a popularized next generation multimedia storage device for storing high grade images with a high degree of tone quality.

Referring to FIG. 1, when playing back a disc 100, a disc motor 160 starts to rotate at a speed, and the optical pickup, having a head 120, converts the disc information into a high frequency analog signal (HF) to be transmitted. This HF signal is shaped into a pulse waveform, whereby an eight-to-sixteen modulation (ESM) or eight-to-fourteen modulation (EFM) data stream is delivered to a phase locked loop (hereinafter referred to as "PLL") 300 and to a system decoder 200. The system decoder 200 performs demodulation, error correction and descrambling of the (ESM, EFM) data stream. A microcomputer 500 is a device control unit for controlling the overall operation of the entire optical disc playback system. When receiving a data transfer start signal from an audio/video decoder 600 or ROM decoder, which is described below, the microcomputer 500 generates a transfer control signal.

The above mentioned PLL 300 consists of a phase comparator, a voltage-controlled oscillator and a frequency divider, and it generates a first clock synchronized with a signal reproduced from the specific optical disc. A disc drive controller 400 controls the constant linear velocity of the disc and other disc-related operations by considering frequency and the phase servo signals according to a frame synchronizing signal Sf provided from a synchronous detector 220. The audio/video decoder 600 performs operations for sorting data output from the system decoder 200 into audio and video data to reproduce the original audio and video data recorded on the disc. The audio and video data demodulated by the audio/video decoder 600 are delivered to an NTSC (or PAL) encoder 700 and to a digital analog converter 800, respectively, thereby being output to a monitor 960 and a speaker 970, respectively. A ROM decoder 950 is typically built into a host (for example, a personal computer) and operated by instructions thereof, which transfers data from the system decoder 200 to the host (computer) according to a specific interface method.

Referring to FIGS. 1 and 2, first and second memories 330, 280 are employed, which are static and dynamic RAMs, respectively, in which the former is used for error correction and the latter is used for data buffering. That is, data retrieved from the disc 100 is demodulated to its state prior to recording and is stored in the first memory 330. The data stored in the first memory 330 is retrieved in units of blocks and delivered to and corrected by an error corrector 230. The data, corrected by error corrector 230, is then stored again in the first memory 330. The descrambler performs descrambling with respect to the error corrected data retrieved from the first memory 330 and stores descrambled data in the second memory 280.

The data stored in the second memory 280 is retrieved to be transferred to the audio/video decoder 600 or to the ROM decoder 950. The audio/video decoder 600 sorts the data transmitted from the system decoder 200 into audio and video data, respectively, in order to reproduce the original audio and video data, respectively. The built-in ROM decoder 950 within the host (for example, a personal computer) is operated by instructions of the host, thereby transferring the data from the system decoder 200 to the host (computer) according to the specific interface method.

The first and second memory controllers 320, 270 perform functions to generate addresses and to prevent overflow and under-flow conditions, etc. for the first and second memories 280, 330, respectively. As mentioned above, since the conventional system decoder 200 includes separate memories for error correcting and data buffering, and accordingly, includes separate respective memory controllers, the construction of the system decoder becomes not only complicated and expensive, and also makes it difficult to miniaturize products incorporating the same.

SUMMARY OF THE INVENTION

Accordingly, it is an object of the present invention to provide an inexpensive and miniaturized digital video disc playback device capable of error correcting and data buffering by means of a single memory without using separate error correcting and data buffering memories.

Another object of the invention is to provide a method for using single memory in a system decoder for storing a plurality of types of data used in the system decoder.

To achieve the object of the invention there is provided a system decoder for demodulating, error correcting, deinterleaving and descrambling of data reproduced from discs in the digital video disc playback device according to the present invention comprises a memory, and a memory controller for generating addresses for recording and retrieving data by accessing the memory when demodulating, error correcting and descrambling the information reproduced from the disc.

To achieve another object of the invention, there is provided a method for decoding data reproduced from a digital video disc, used in a playback device including a main device controller and a system decoder having a memory device. The method comprises demodulating a data stream generated from data retrieved from the disc into symbols, wherein each of the symbols contains a predetermined number of bits, outputting demodulated data and storing the demodulated data in the memory device; retrieving a block of the demodulated data from the memory and performing error correction operations on the block of demodulated data to correct an error in the retrieved demodulated data and storing error corrected data which includes ID data and main data in the memory device; retrieving from the memory device and descrambling only the main data from among the error corrected data stored in the memory device, thereby restoring data originally recorded on the disc and storing descrambled data in the memory device; and retrieving from the memory device the error corrected data and detecting an error contained in the ID data of the error corrected data.

The present invention will now be described more specifically with reference to the drawings attached only by way of example.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT

A preferred embodiment of a system decoder employing a single memory for storing both error correction data, and acting as a data buffer, according to the present invention, is described below in detail with reference to the accompanying drawings.

Figure 1:
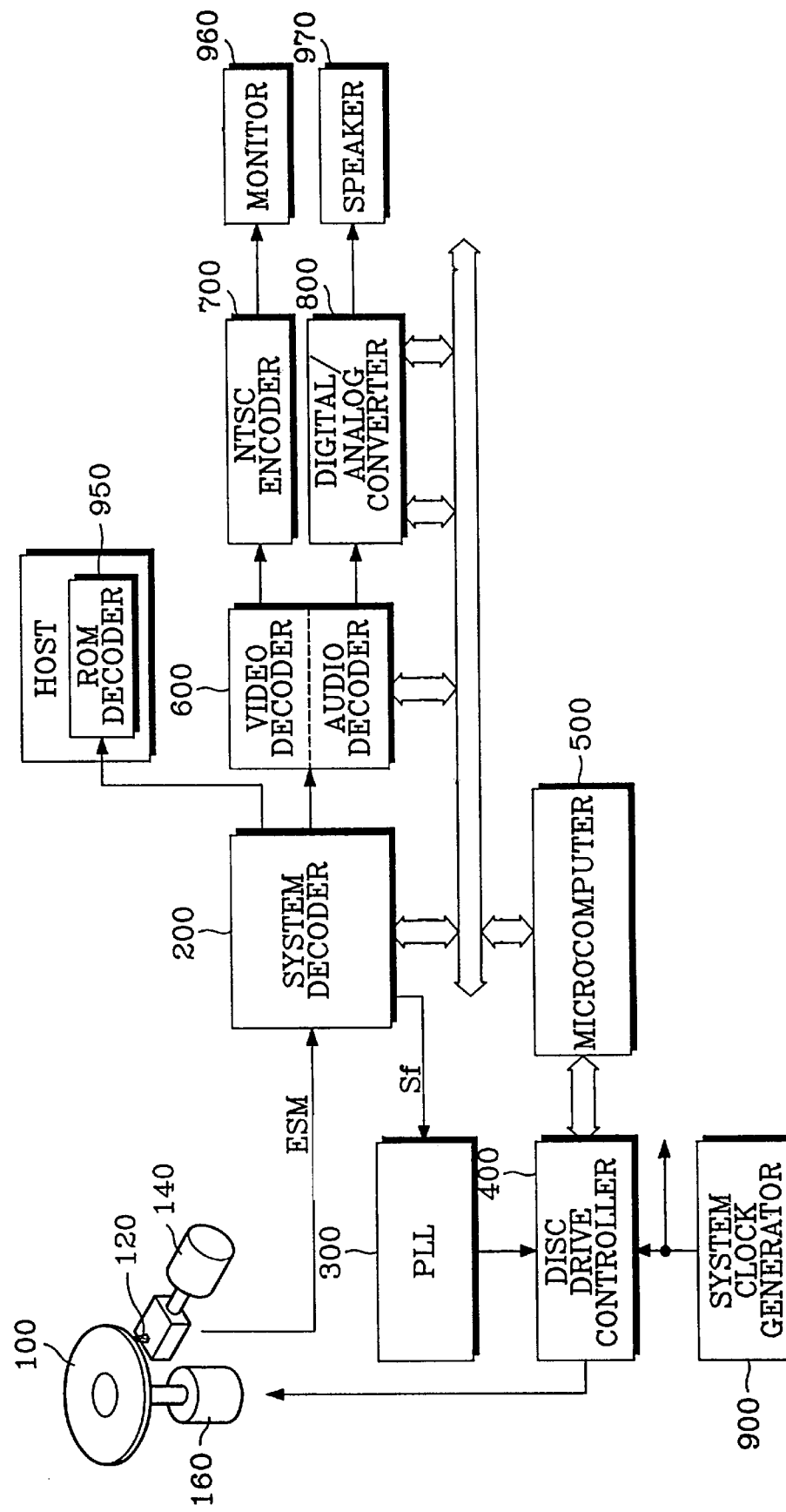
FIG. 1 is a schematic block diagram illustrating a conventional digital video disc playback device.
Figure 2:
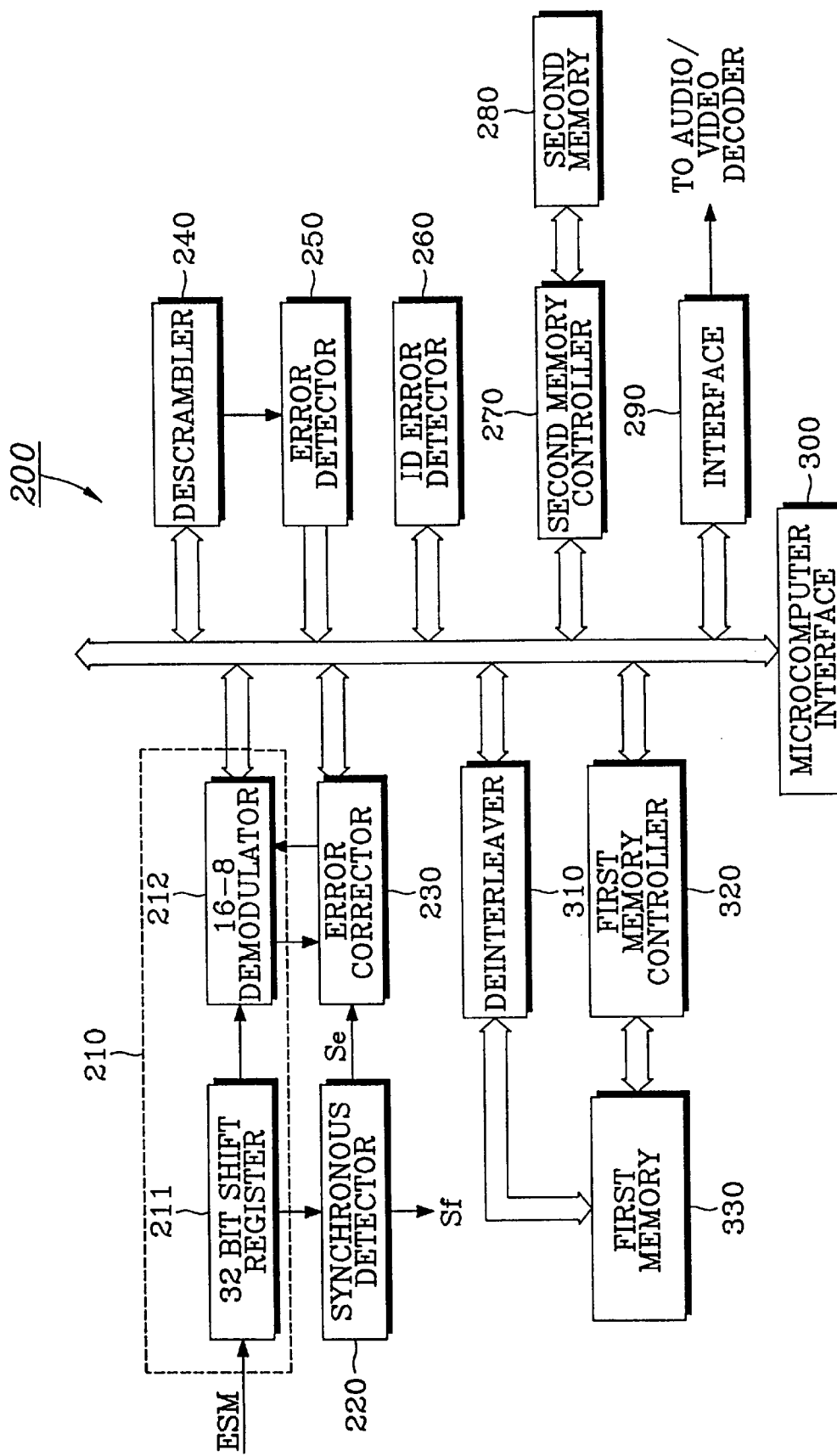
FIG. 2 is a block diagram illustrating a detailed structure of the system decoder 200 shown in FIG. 1.
Figure 3:
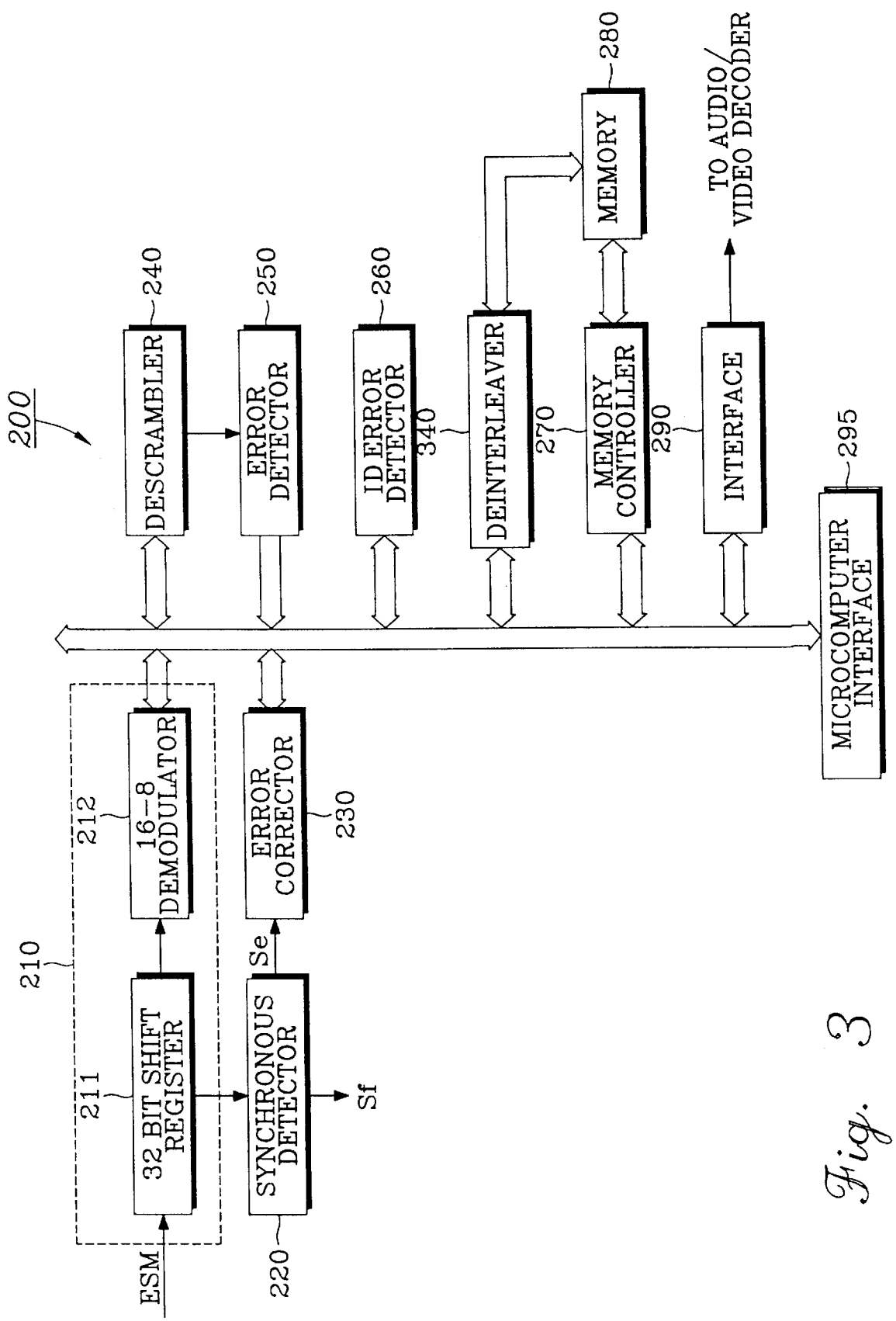
FIG. 3 is a block diagram illustrating a system decoder of the digital video disc playback device according to an embodiment of the present invention.

Referring to FIG. 3, the memory 280 is preferably a dynamic RAM. The microcomputer interface 295 interfaces the microcomputer 500 and the inventive system decoder 200. The microcomputer 500 is a device control unit for controlling the entire digital video disc playback device, and at the same time controls the overall operation of the inventive system decoder 200.

When playing back the disc 100, the disc motor 160 starts to rotate at a certain speed, and the optical pickup, having a head 120, converts the disc information into a high frequency analog signal (HF) to be transmitted. This HF signal is shaped into a pulse waveform, whereby the ESM data stream is delivered to a demodulator unit 210 shown in FIG. 3.

The demodulator unit 210 demodulates symbols in the ESM data stream, wherein the symbols each contain a predetermined number of bits. The demodulator unit 210 inputs the ESM data stream to a 32 bit shift register 211, and selects the high (or low) 16 bits from among the 32 bits output from the 32 bit shift register 211 so as to deliver those bits to a 16-8 demodulator 212. The 16-8 demodulator 212 converts the received 16 bits of data into a symbol containing 8 bits, to be transmitted. The reason for converting the data is that the data are modulated from eight to sixteen when recording the data on the disc 100.

The PLL 300 consists of a phase comparator, a voltage-controlled oscillator and a frequency divider, and it generates the first clock synchronized with the reproduced signal. The system clock generator 900 preferably is a crystal oscillator which generates a second clock, i.e. the system clock.

The synchronous detector 220 receives the first clock and the 32 bit signal output from the 32 bit shift register 211, thereby generating signals Sf and Se for detecting various synchronization patterns, such as a frame synchronization pattern which is used as a standard clock for controlling the rotation of the disc 100, a sector synchronization pattern for distinguishing sectors, an error correcting synchronization pattern for recognizing the error correcting time so as to retrieve the data from the corresponding error correction block, etc. Further, the synchronous detector 220 performs operations for setting a window for admitting only the synchronizing detection within a given range or for compelling generation of detection signals when the predetermined synchronous detection fails.

The disc drive controller 400 controls the velocity of the disc to a constant linear velocity, and controls other disc-related operations by considering frequency and phase servo signals according to the frame synchronizing signal Sf output from the synchronous detector 220.

The error corrector 230 performs error correction in both horizontal and vertical directions with respect to prescribed blocks containing data retrieved from the disc 100. In this embodiment, the horizontal and vertical directions are 182, 172, 11 and 208, 192, 17 bits, respectively. Namely, the lengths of the horizontal and vertical code words are 182 and 208 bits, respectively, the main data, except for parity, are 172 and 192 bits, respectively, and the intervals between the code words are 11 and 17 bits, respectively.

The memory 280 is divided into three areas having fixed locations—a demodulated data writing area, a error correction data read/write area, and a transmission data area.

The memory 280 stores ID data and main data transmitted from the demodulator 210, in predetermined sized blocks, in the demodulated data writing area. In other words, under control of the microcomputer 500, the memory controller 270 allocates proper addresses for the memory 280 and supplies corresponding demodulated data thereto so as to form an error correcting block which includes data for 16 sectors. Further, the memory 280 buffers data and stores error corrected data in the error correction data read/write area at intervals between error correction operations performed for the two directions discussed above (i.e., horizontal and vertical direction). In other words, memory 280 stores demodulated data output from demodulator 210, and error corrected data, which is error corrected in both horizontal and vertical directions, which is output from error corrector 230. Moreover, memory 280 data buffers the intermediate error correction results by first storing the horizontally error corrected data, and then subsequently storing the vertically error corrected data, output from the error corrector 230 during intervals between performing the horizontal and vertical error corrections, before producing the overall error corrected data stored in memory 280.

Figure 4:
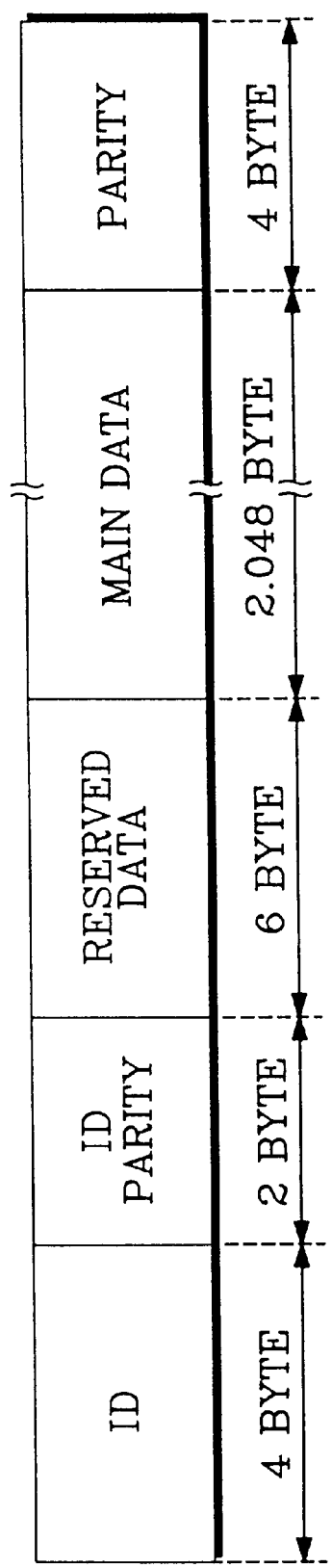
FIG. 4 is an explanatory chart illustrating the constituent data of a sector retrieved from the digital video disc.

Since the main data, among the error corrected data stored in the memory 280, are scrambled prior to being recorded on the disc, the descrambler 240 retrieves error corrected main data stored in memory 280, descrambles the retrieved main data to restore it as the original data, and stores the descrambled main data back into memory 280 in the transmission data area. Referring to FIG. 4, the above described main data preferably consists of 2 kilobytes.

The error detector 250 detects errors contained in the descrambled data output from the descrambler 240. The detected error information is delivered to the microcomputer 500 which determines, on the basis thereof, whether or not error correction has to be further repeated.

The deinterleaver 340 includes a means for storing an interleaving rule, an address counter and an adder, etc., and restores the data, which is interleaved by frames, to its original array format and stored the deinterleaved data in the memory by controlling the recording/retrieving address of the memory 280. In the present embodiment, although the deinterleaver 340 is represented separately in the drawing, when implementing the device in actual circuitry the deinterleaver 340 can be however included in the memory controller 270 so that the error correcting, descrambling and also deinterleaving operations can be simultaneously performed.

Referring to FIG. 3, the memory controller 270 performs operations to generate a low address signal, a column address signal and other address signals and to prevent over- and underflow conditions from occurring, under the control of the microcomputer 500. Namely, the memory controller 270 stores the data retrieved from the disc 100, output from demodulator 210, in the memory 280 and then retrieves the restored data, or in other words the demodulated data, in units of blocks, to deliver it to the error corrector 230 for error correction. The memory controller then overwites the error corrected data on the position of the memory 280 from which the demodulated data was retrieved. Further, when performing descrambling and deinterleaving operations, the memory controller 270 operates to retrieve data stored in the memory and stores the descrambled data and deinterleaved data back into the memory 280 in the transmission data area.

The ID error detector 260 retrieves only the ID data from among the error corrected data stored in the memory 280 just before transmitting the data to the audio/video decoder 600 after finishing system decoding, whereby the ID data is subjected to ID error correction. The corrected ID data is transferred together with an embedded ID error flag to the microcomputer 500 which uses the corrected ID data as a reference for controlling the search operation of the disc 100. Further, the corrected ID data is transferred together with the system decoded main data to the audio/video decoder 600. The ID data denotes sector information as a physical address on the disc 100, thereby containing 4 bytes as shown in FIG. 4. In the present embodiment, the error correction type is assumed as a Reed-Solomon RS(6, 4, 3), where the "6" indicates the codeword length, "4" indicates the main ID data, and "3" indicates the interval between the codewords.

The interface 290 interfaces the inventive system decoder 200 and the audio/video decoder 600. For example, under control of the microcomputer 500, the memory controller 270 retrieves the descrambled data from the memory 280 according to the system clock, thereby transferring the descrambled data to the audio/video decoder 600 through the interface 290. Also, when receiving the corrected ID data, the microcomputer 500 delivers the disc search instructions to the disc drive controller 400 through the microcomputer interface 295. Further, the interface 290 interfaces the inventive system decoder 200 and the ROM decoder 950. When playing back the usual digital video disc, the retrieved data is transferred to the audio/video decoder 600. On the contrary, when playing back the digital video disc-ROM, the retrieved data is transferred to the ROM decoder 950. In other words, when controlling timing, removing noise, changing signal array and transferring addresses for interfacing between the inventive system decoder 200 and the audio/video decoder 600 or the ROM decoder 950, the interface 290 performs operations related to address decoding, and the like.

Thus, the present invention has the advantage that the inventive device is capable of error correcting and data buffering by means of a single memory without requiring separate error correcting and data buffering memories. This allows for inexpensive, simplified and easily miniaturized construction.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed herein as the best mode contemplated for carrying out the present invention, but that the present invention includes all embodiments falling within the scope of the appended claims.

What is claimed is:

1. A system decoder, employed in a digital video disc playback device, for demodulating, error correcting, deinterleaving and descrambling information reproduced from a disc, the system decoder comprising:

a memory for storing demodulated information reproduced from said disk;

a memory controller for generating addresses and for recording and retrieving said demodulated information by accessing said memory when demodulating, error correcting, and descrambling the information reproduced from the disc; and wherein said demodulated information is recorded in said memory prior to said error correcting.

2. The system decoder as defined in claim 1, wherein said memory is a dynamic RAM.

3. The system decoder as defined in claim 1, wherein data produced by said demodulating, error correcting and descrambling the information reproduced from the disk, is stored in said memory according to the addresses generated by said memory controller.

4. A system decoder of a digital video disc playback device having a main device controller and an audio/video decoder, the system decoder comprising:

a memory;

a first interface for interfacing the main device controller and the system decoder;

a second interface for interfacing the audio/video decoder and the system decoder;

a demodulator for demodulating a data stream generated from information retrieved from a disc into symbols each containing a predetermined number of bits and outputting a demodulated signal;

a synchronous detector for generating signals used for detecting in the data stream synchronous patterns used in reproducing digital video disc information;

an error corrector for error correcting data of said demodulated signal, and outputting error corrected data which includes ID data and main data;

a descrambler for receiving and descrambling only the main data from among said error corrected data, thereby restoring data originally recorded on the disc, and outputting descrambled data;

an error detector for detecting an error contained in the descrambled data and outputting the detected error to the main device controller to determine whether to repeat error correction of the descrambled data;

an ID error corrector for correcting an error in the ID data of the error corrected data and delivering corrected ID data as disc search information to the main device controller; and a memory controller for controlling access to said memory for storing the error corrected data and operating as a data buffer under control of the main device controller.

5. The system decoder as defined in claim 4, wherein said memory controller stores the demodulated data in said memory and then retrieves and delivers the demodulated data, in units of blocks, to said error corrector.

6. The system decoder as defined in claim 5, wherein when said descrambler performs descrambling said memory controller retrieves from said memory the error corrected data and then stores in said memory the descrambled data.

7. The system decoder as defined in claim 6, further comprising a deinterleaver for deinterleaving the descrambled data, wherein when the deinterleaver performs deinterleaving said memory controller retrieves from said memory the descrambled data and then stores the deinterleaved data in said memory.

8. The system decoder as defined in claim 4, wherein said memory is a dynamic RAM.

9. The system decoder as defined in claim 4, wherein said memory controller comprises:

means for storing in said memory data of said demodulated signal as demodulated data;

means for retrieving in predetermined sized blocks said demodulated data stored in said memory, and delivering the retrieved demodulated data to said error corrector;

means for overwriting said error corrected data on the position of said memory from which said demodulated data was retrieved; and means for generating address signals for retrieving from said memory the error corrected data stored therein and sending the retrieved error correction data to one of said descrambler and said deinterleaver to descramble and deinterleave, respectively, the retrieved error corrected data, and for recording in said memory data output from said one of said descrambler and said deinterleaver.

10. The system decoder as defined in claim 9, wherein said memory is a dynamic RAM.

11. The system decoder as defined in claim 9, wherein said error corrector performs said error correction in horizontal and vertical directions of said block, and said memory performs said data buffering by storing intermediate results of the error correction during an interval between performing the error correction in the horizontal direction and performing the error correction in the vertical direction.

12. The system decoder as defined in claim 11, wherein said memory is a dynamic RAM.

13. The system decoder as defined in claim 4, wherein the main device controller is a microcomputer.

14. The system decoder as defined in claim 13, wherein said memory is a dynamic RAM.

15. A system decoder of a digital video disc playback device having a main device controller and a ROM decoder, the system decoder comprising:

a memory;

a first interface for interfacing the main device controller and the system decoder;

a second interface for interfacing the ROM decoder and the system decoder;

a demodulator for demodulating a data stream generated from data retrieved from a disc into symbols, wherein each of the symbols contains a predetermined number of bits and outputting demodulated data;

a synchronous detector for generating signals for detecting in the data stream various synchronous patterns used for reproducing digital video disc information;

an error corrector for correcting an error in said demodulated data and outputting error corrected data which includes ID data and main data;

a descrambler for receiving and descrambling only the main data from among said error corrected data, thereby restoring data originally recorded on the disc and outputting descrambled data;

an error detector for detecting an error contained in the descrambled data and outputting the detected errors to the main device controller for determining whether to repeat error correction;

an ID error corrector for correcting an error in the ID data and delivering corrected ID data as disc search information to the main device controller; and a memory controller for controlling access to an area of said memory for storing the error corrected data and performing data buffering under control of the main device controller.

16. The system decoder as defined in claim 15, wherein said memory controller stores the demodulated data in said memory and then retrieves and delivers the demodulated data, in units of blocks, to said error corrector.

17. The system decoder as defined in claim 16, wherein when said descrambler performs descrambling said memory controller retrieves from said memory the error corrected data and then stores in said memory the descrambled data.

18. The system decoder as defined in claim 17, further comprising a deinterleaver for deinterleaving the descrambled data, wherein when the deinterleaver performs deinterleaving said memory controller retrieves from said memory the descrambled data and then stores the deinterleaved data in said memory.

19. The system decoder as defined in claim 15, wherein said memory is a dynamic RAM.

20. The system decoder as defined in claim 15, wherein said memory controller comprises:

means for storing in said memory data of said demodulated signal as demodulated data;

means for retrieving in predetermined sized blocks said demodulated data stored in said memory, and delivering the retrieved demodulated data to said error corrector;

means for overwriting said error corrected data on the position of said memory from which said demodulated data was retrieved; and means for generating address signals for retrieving from said memory the error corrected data stored therein and sending the retrieved error correction data to one of said descrambler and said deinterleaver to descramble and deinterleave, respectively, the retrieved error corrected data, and for recording in said memory data output from said one of said descrambler and said deinterleaver.

21. The system decoder as defined in claim 20, wherein said memory is a dynamic RAM.

22. The system decoder as defined in claim 20, wherein said error corrector performs said error correction in horizontal and vertical directions of said block, and said memory performs said data buffering by storing intermediate results of the error correction during an interval between performing the error correction in the horizontal direction and performing the error correction in the vertical direction.

23. The system decoder as defined in claim 22, wherein said memory is a dynamic RAM.

24. The system decoder as defined in claim 15, wherein the main device controller is a microcomputer.

25. The system decoder as defined in claim 24, wherein said memory is a dynamic RAM.

26. A method for decoding data reproduced from a digital video disc, used in a playback device including a main device controller and a system decoder having a memory device, the method comprising:

demodulating a data stream generated from data retrieved from the disc into symbols, wherein each of the symbols contains a predetermined number of bits, outputting demodulated data and storing the demodulated data in the memory device;

retrieving a block of the demodulated data from the memory and performing error correction operations on the block of demodulated data to correct an error in the retrieved demodulated data and storing error corrected data which includes ID data and main data in the memory device;

retrieving from the memory device and descrambling only the main data from among said error corrected data stored in the memory device, thereby restoring data originally recorded on the disc and storing descrambled data in the memory device; and retrieving from the memory device said error corrected data and detecting an error contained in the ID data of the error corrected data.

27. The method recited in claim 26, further comprising detecting an error in the descrambled data stored in the memory device and outputting the detected error of the descrambled data to the main device controller for determining whether to repeat error correction.

28. The method recited in claim 26, further comprising correcting the error detected in the ID data and delivering corrected ID data as disc search information to the main device controller.

29. The method recited in claim 26, further comprising using the memory device as a data buffer by storing intermediate results of said error correction operations in the memory device.

30. The method recited in claim 29, wherein said error correction operations include performing error correction on the block in a horizontal direction and performing error correction on the block in a vertical direction, and producing the intermediate results during an interval between performing the error corrections in the horizontal and vertical directions.

* * * * *